(12) United States Patent
Johnson

(10) Patent No.: US 8,577,599 B2
(45) Date of Patent: Nov. 5, 2013

(54) METHOD AND SYSTEM TO CALCULATE HISTORICAL TRAFFIC DATA

(75) Inventor: Richard A. Johnson, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 1378 days.

(21) Appl. No.: 12/165,183

(22) Filed: Jun. 30, 2008

(65) Prior Publication Data

US 2009/0326802 A1 Dec. 31, 2009

(51) Int. Cl.
*G01C 21/34* (2006.01)

(52) U.S. Cl.
USPC .......... 701/411; 701/412; 701/413; 701/414; 701/415; 701/416; 701/417; 701/418

(58) Field of Classification Search
USPC ............. 701/201, 32.4, 342, 411–418, 423, 701/468–491
See application file for complete search history.

(56) References Cited

U.S. PATENT DOCUMENTS

| 2002/0120396 A1* | 8/2002 | Boies et al. | 701/209 |
| 2005/0222764 A1* | 10/2005 | Uyeki et al. | 701/210 |
| 2005/0251325 A1* | 11/2005 | Kudo et al. | 701/200 |

* cited by examiner

*Primary Examiner* — Jeffrey A Smith
*Assistant Examiner* — Resha Desai
(74) *Attorney, Agent, or Firm* — Leydig, Voit & Mayer, Ltd.

(57) ABSTRACT

A system for a vehicle navigation accurately calculates travel times between locations and serves a vehicle driver request for the shortest time route. A navigation server compiles data of common road segments between two locations that are contained in route requests and subsequently calculates travel time between the two locations. When subsequent route requests contain further information pertaining to the same locations, the navigation server updates the travel time. Consequently, the navigation server can calculate the travel times of different routes from the same source vehicle location and destination location. When a vehicle driver requests directions from the vehicle's current location to a destination, the navigation server then provides directions for the shortest time route to the vehicle driver.

5 Claims, 9 Drawing Sheets

| Route 602 | Time at Location A 604 | Time at Location B 606 | Travel Time Between Location A and Location B 608 | Average Travel Time Between Location A and Location B 610 |
| --- | --- | --- | --- | --- |
| Home 1 to Store 1 612 | 7:55 614 | 8:45 616 | 50 minutes 618 | 50 minutes 620 |
| Home 2 to Store 2 622 | 10:55 624 | 11:25 626 | 30 minutes 628 | 40 minutes 630 |
| Home 3 to Store 3 632 | 5:05 634 | 5:55 636 | 50 minutes 638 | 43 minutes 640 |
| Home 4 to Store 4 642 | 1:55 644 | 2:25 646 | 30 minutes 648 | 40 minutes 650 |
| Home 5 to Store 5 652 | 8:25 654 | 9:10 656 | 45 minutes 658 | 41 minutes 660 |
| Home 6 to Store 6 662 | 3:05 664 | 3:30 666 | 25 minutes 668 | 38 minutes 670 |

FIG. 6

Rush Hour Travel Time

| Route 702 | Time at Location A 704 | Time at Location B 706 | Travel Time Between Location A and Location B 708 | Average Time Between Location A and Location B 710 |
|---|---|---|---|---|
| Home 1 to Store 1 712 | 7:55 714 | 8:45 716 | 50 minutes 718 | 50 minutes 720 |
| Home 3 to Store 3 722 | 5:05 724 | 5:55 726 | 50 minutes 728 | 50 minutes 730 |
| Home 5 to Store 5 732 | 8:25 734 | 9:10 736 | 45 minutes 738 | 48 minutes 740 |

Non-Rush Hour Travel Time

| Route 742 | Time at Location A 744 | Time at Location B 746 | Travel Time Between Location A and Location B 748 | Average Travel Time Between Location A and Location B 750 |
|---|---|---|---|---|
| Home 2 to Store 2 752 | 10:55 754 | 11:25 756 | 30 minutes 758 | 30 minutes 760 |
| Home 4 to Store 4 762 | 1:55 764 | 2:25 766 | 30 minutes 768 | 30 minutes 770 |
| Home 6 to Store 6 772 | 3:05 774 | 3:30 776 | 25 minutes 778 | 28 minutes 780 |

FIG. 7

| Route 802 | Time at Location C 804 | Time at Location D 806 | Travel Time Between Location C and Location D 808 | Average Travel Time Between Location C and Location D 810 |
|---|---|---|---|---|
| Home 1 to Store 1 812 | 7:55 814 | 8:40 816 | 45 minutes 818 | 45 minutes 820 |
| Home 2 to Store 2 822 | 10:55 824 | 11:30 826 | 35 minutes 828 | 40 minutes 830 |
| Home 3 to Store 3 832 | 5:05 834 | 5:45 836 | 40 minutes 838 | 40 minutes 840 |
| Home 4 to Store 4 842 | 1:55 844 | 2:30 846 | 35 minutes 848 | 39 minutes 850 |
| Home 5 to Store 5 852 | 8:25 854 | 9:10 856 | 45 minutes 858 | 40 minutes 860 |
| Home 6 to Store 6 862 | 3:05 864 | 3:40 866 | 35 minutes 868 | 39 minutes 870 |

FIG. 8

Rush Hour Travel Time

| Route 902 | Time at Location C 904 | Time at Location D 906 | Travel Time Between Location C and Location D 908 | Average Time Between Location C and Location D 910 |
|---|---|---|---|---|
| Home 1 to Store 1 912 | 7:55 914 | 8:40 916 | 45 minutes 918 | 45 minutes 920 |
| Home 3 to Store 3 922 | 5:05 924 | 5:45 926 | 35 minutes 928 | 40 minutes 930 |
| Home 5 to Store 5 932 | 8:25 934 | 9:10 936 | 45 minutes 938 | 42 minutes 940 |

Non-Rush Hour Travel Time

| Route 942 | Time at Location C 944 | Time at Location D 946 | Travel Time Between Location C and Location D 948 | Average Travel Time Between Location C and Location D 950 |
|---|---|---|---|---|
| Home 2 to Store 2 952 | 10:55 954 | 11:30 956 | 35 minutes 958 | 35 minutes 960 |
| Home 4 to Store 4 962 | 1:55 964 | 2:30 966 | 35 minutes 968 | 35 minutes 970 |
| Home 6 to Store 6 972 | 3:05 974 | 3:40 976 | 35 minutes 978 | 35 minutes 980 |

FIG. 9

METHOD AND SYSTEM TO CALCULATE HISTORICAL TRAFFIC DATA

FIELD OF THE INVENTION

The present invention relates generally to providing driving directions from a vehicle navigation system, and in particular to a method and system of using historical traffic data to calculate accurate travel times when providing driving directions for a shortest route with respect to time from a vehicle navigation system.

BACKGROUND OF THE INVENTION

A vehicle driver may use a telematics unit as part of a vehicle navigation system to provide him or her with turn-by-turn directions. When the vehicle driver requests directions, the telematics unit sends a route request to a navigation server that is also part of the vehicle navigation system that contains the vehicle's current location, time-of-day, and destination. Thereafter, the vehicle navigation system provides turn-by-turn directions of the shortest route with respect to distance from the vehicle's current location to the destination. However, the shortest route with respect to distance (shortest distance route) may not be the shortest route with respect to time (shortest time route). For example, the shortest distance route may have high traffic congestion during rush hour and thus may not be the shortest time route at that time. An alternate route that may be longer with respect to distance may be shorter with respect to time. Thus, there is a need for a vehicle navigation system to be able to determine accurate travel times between two locations during a specific time-of-day to provide a vehicle driver the shortest time route when he or she requests route directions to a destination.

BRIEF SUMMARY OF THE INVENTION

Aspects of the invention provide for a system and method for a vehicle navigation system to accurately calculate travel times between locations and then provide for a vehicle driver requesting directions for the shortest time route instead of the shortest distance route based on the time-of-day. Each route request is entered into a navigation server that is part of the vehicle navigation system and contains the destination, the vehicle's current location, and time-of-day information. The navigation server compiles data of common road segments between two locations that are contained in the route requests. The navigation server subsequently analyzes the data to calculate the travel time between the two locations. When subsequent route requests contain further information pertaining to the same two locations, the navigation server updates the travel time between the two locations.

Consequently, the navigation server can calculate the travel times of different routes from the same source vehicle location and destination location. Subsequently, when a vehicle driver requests directions from the vehicle's current location to a destination, the navigation server analyzes the travel times based on the time-of-day to determine the shortest time route. The navigation server then provides the directions for this shortest time route to the vehicle driver.

BRIEF DESCRIPTION OF THE SEVERAL VIEWS OF THE DRAWING(S)

FIGS. 6-9 are tables that contains examples of using historical traffic data to calculate travel times between locations.

DETAILED DESCRIPTION OF THE INVENTION

Before describing the invention in detail, an exemplary environment in which the invention may operate will be described. It will be appreciated that the described environment is for purposes of illustration only, and does not imply any limitation regarding the use of other environments to practice the invention.

Figure 1:
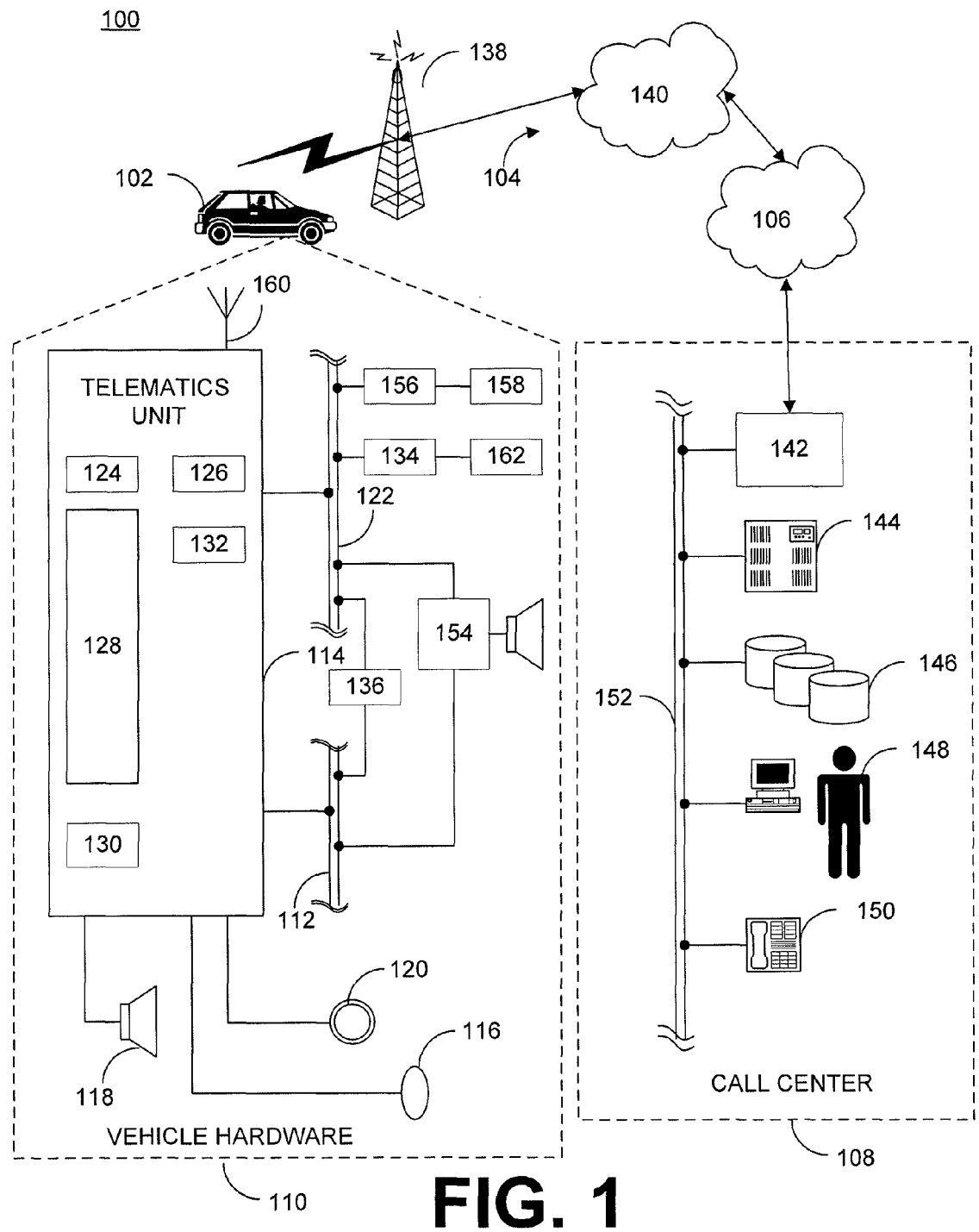
FIG. 1 is a schematic view of an example communication system within which examples of the disclosed system may be implemented.

With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various accident and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle accident and/or collision detection sensor interface 156 are operatively connected to the vehicle bus 122. The accident sensors 158 provide information to the telematics unit via the accident and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include powertrain control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment 150 that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem or other piece of equipment 150 for demodulation and further signal processing. The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

Figure 2:
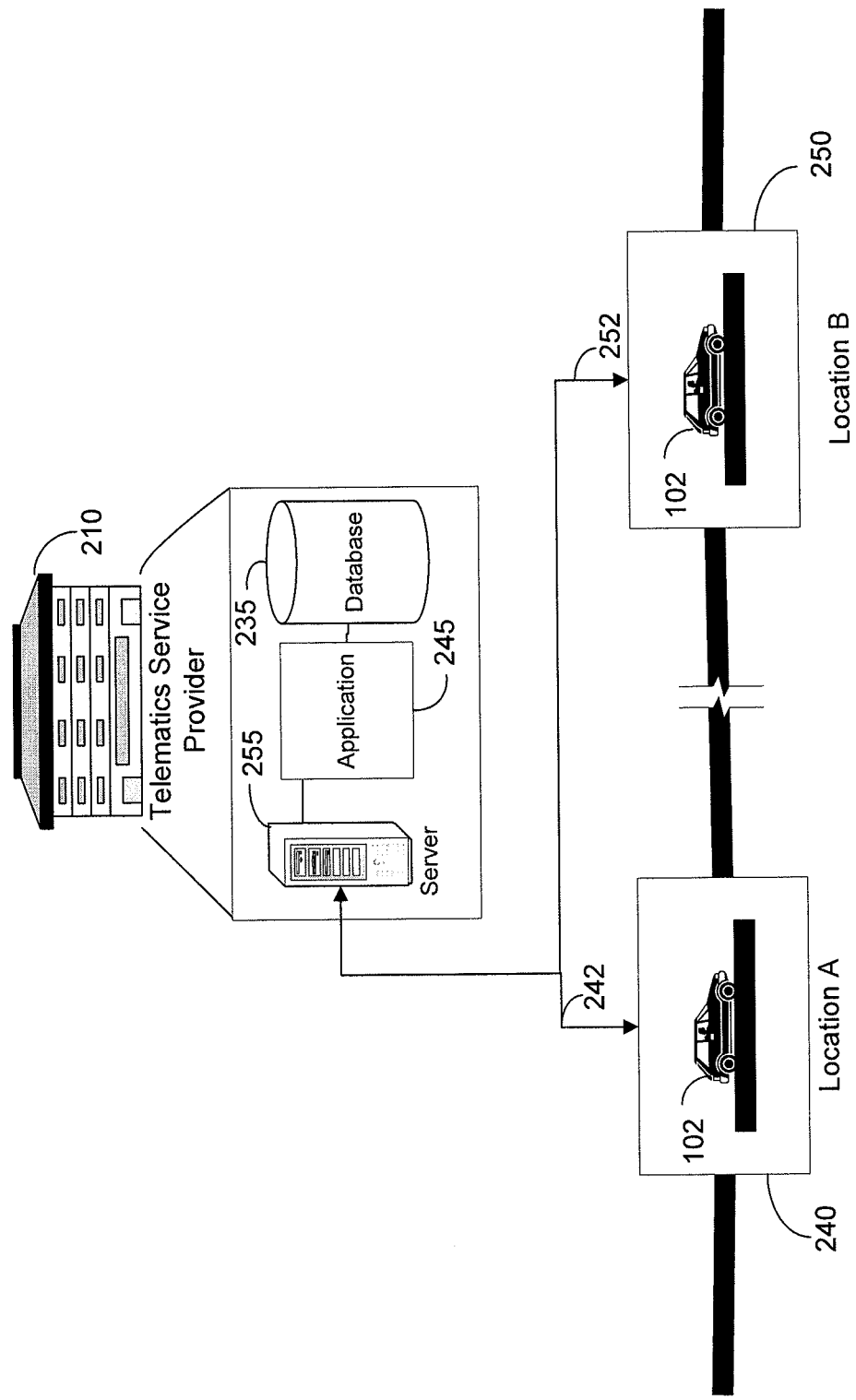
FIG. 2 is a schematic view of an exemplary system architecture in keeping with the disclosed principles.

FIG. 2 is a schematic view of an exemplary system architecture in keeping with the disclosed principles. A vehicle driver 102 may send a route request to a telematics service provider 210 requesting directions from the vehicle's current location 240 (Location A) to a destination. The route request is sent to the telematics service provider 210 via a wireless link 242 and is entered into a navigation server 255 using a software application 245 and stored in a database 235. The route request contains time-of-day information as well as the vehicle's current location 240 (Location A). At a later time, the same vehicle driver 102 sends another route request to the telematics service provider 210 requesting directions from the vehicle's new current location 250 (Location B) to the destination. There could be many reasons for the later route request from the vehicle driver 102 that include, for example, the vehicle driver being lost or preferring an alternate route, or that there is high traffic congestion or a road closure along the route. Another route request is sent to the telematics service provider 210 from the vehicle's current location (Location B) via a wireless link 242 and is entered into a navigation server 255 using a software application 245 and stored in a database 235. The route request contains time-of-day information as well as the vehicle's current location 250 (Location B). Thus with the time-of-day information for each location, the navigation server can calculate the travel time between Location A and Location B.

Figure 3:
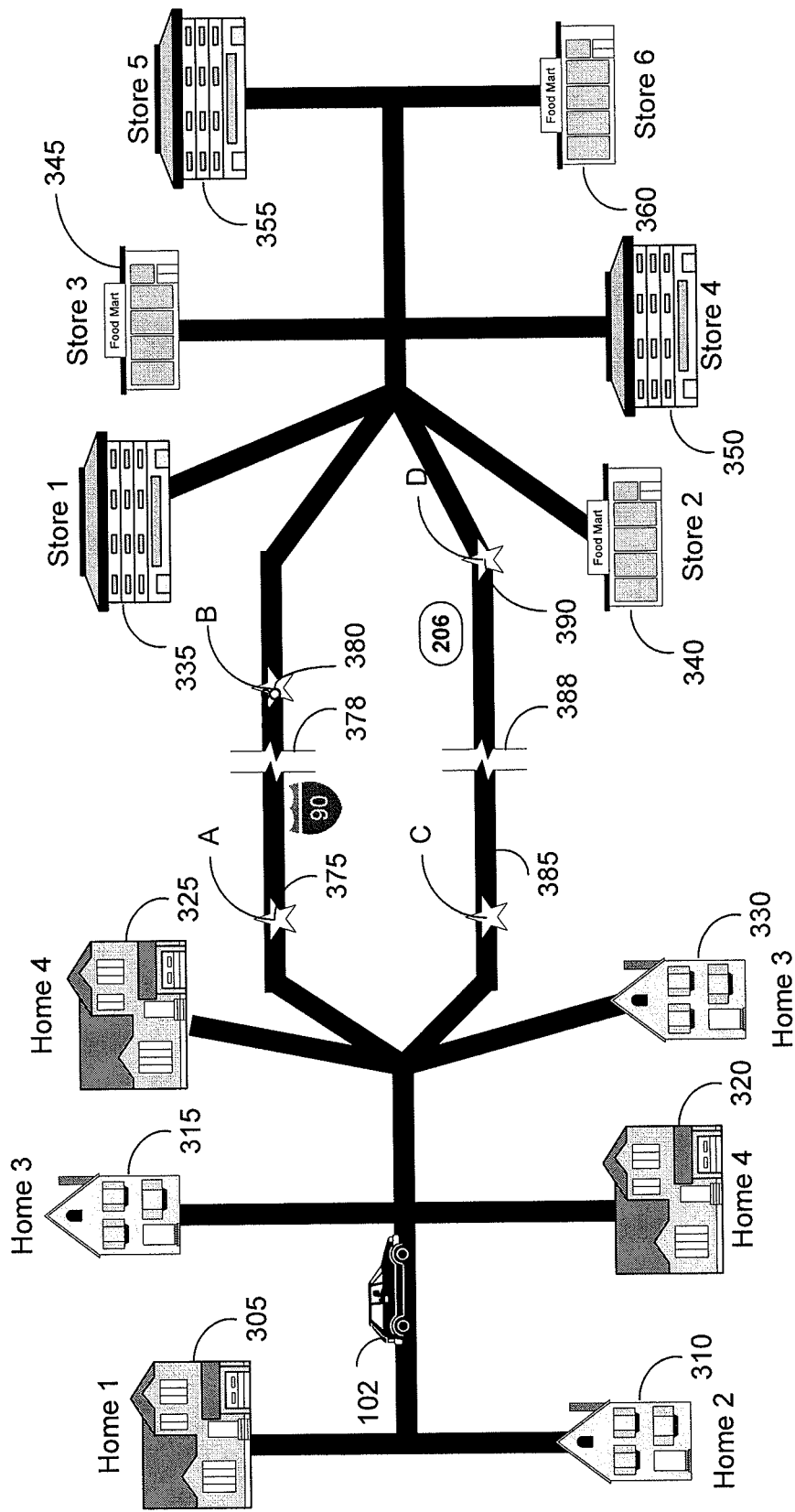
FIG. 3 illustrates exemplary routes that traverse common locations from where a navigation server may receive route requests to calculate accurate travel times between the locations in keeping with the disclosed principles.

FIG. 3 illustrates exemplary routes that traverse common locations from where a navigation server may receive route requests to calculate accurate travel times between the locations in keeping with the disclosed principles. Different vehicle drivers may drive on different routes but traverse common road segments between two common locations. For example, a vehicle driver 102 may travel from Home 1 (305) to Store 1 (335). This may be designated as a Route 1. She may travel on an Interstate Highway 90 and traverse Location A (375) and Location B (380). She may send a route request to a vehicle navigation system from a Location A containing the vehicle's current location and time-of-day. She may later on the same trip send another route request from a Location B also containing the vehicle's current location and time-of-day. Analyzing the two route requests, a navigation server that is part of the vehicle navigation system calculates the travel time between Location A (375) and Location B (380) for a Route 1. Similarly, a vehicle driver that travels from Home 2 (310) to Store 2 (340) may also traverse Location A (375) and Location B (380). The route between Home 2 (310) to Store 2 (340) is Route 2. The vehicle driver may also send a route request containing the time-of-day from both Location A (375) and Location B (380). The navigation server calculates the travel time between Location A (375) and Location B (380) for a Route 2 and updates the travel time it has stored between Location A (375) and Location B (380) by averaging the travel time between Location A and Location B from Route 1 and the travel time between Location A and Location B for Route 2. A navigation server may compile and update travel times from vehicle drivers traveling across a variety routes (e.g., a Route 3 may be from Home 3 (315) to a Store 3 (345)).

Figure 4:
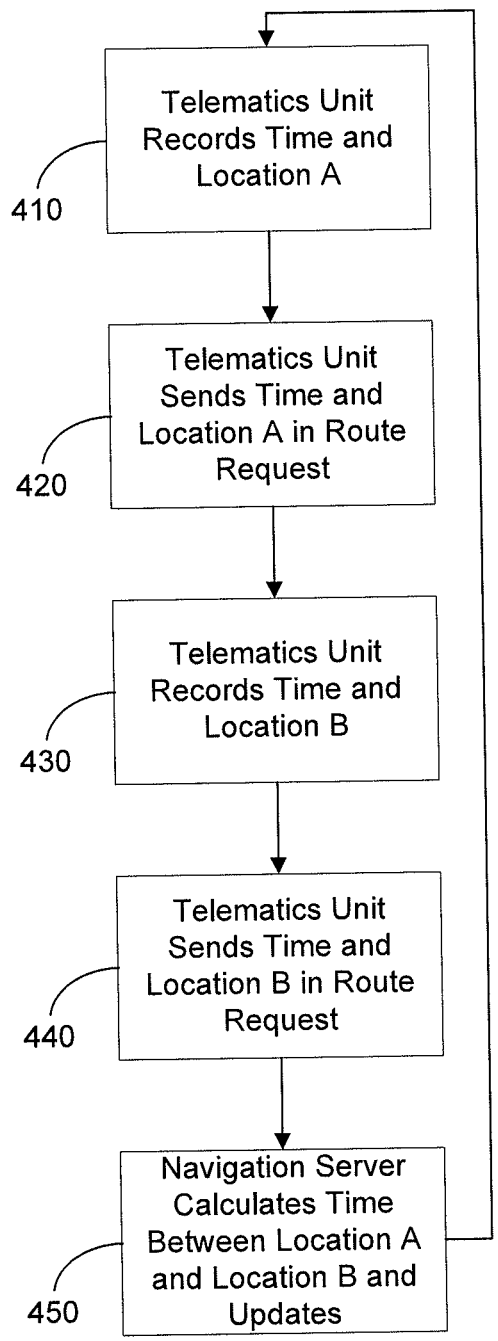
FIGS. 4-5 are flow diagrams that illustrate exemplary aspects of a method of using historical traffic data to calculate travel times between locations.
Figure 5:
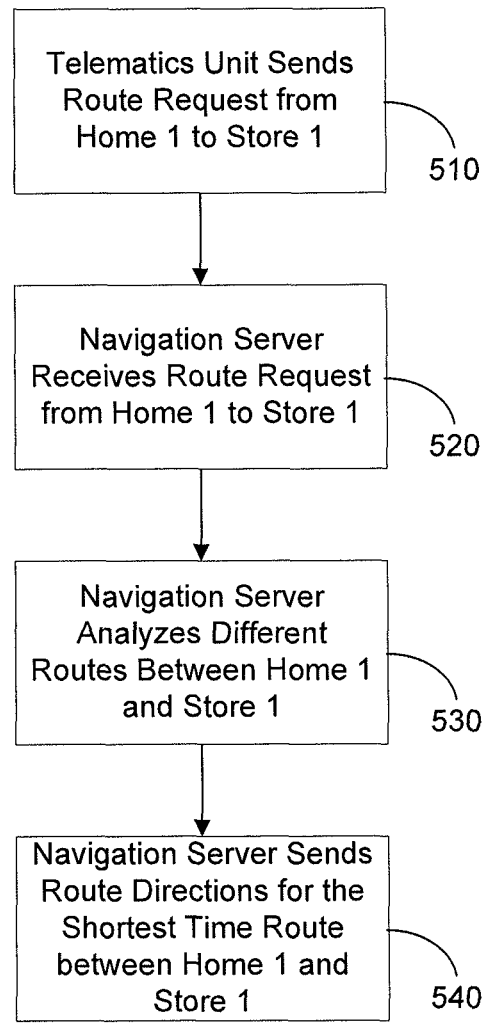

FIGS. 4-5 are flow diagrams that illustrate exemplary aspects of a method of using historical traffic data to calculate travel times between locations. FIG. 4 is a flow diagram that illustrates an exemplary method in calculating and updating the travel times between two locations. When a vehicle driver requests route directions at step 410, a telematics unit records the time-of-day and the current vehicle Location A. At step 420, the telematics unit sends the time-of-day and the current vehicle Location A in a route request to a navigation server that is part of a vehicle navigation system offered by a telematics service provider. When a vehicle driver requests another set of route directions at step 430, a telematics unit records the time-of-day and a current vehicle Location B. At step 440, the telematics unit sends the time-of-day and current vehicle Location B in another router request to the navigation server. The navigation server calculates the travel time between Location A and Location B and updates the travel time recorded in its database between Location A and Location B. The update may be just averaging the current travel time with the previous travel times calculated from previous route requests. The exemplary method may continue to feedback to step 410 when a different telematics unit records the time-of-day and current vehicle Location A.

FIG. 5 is a flow diagram that illustrates an exemplary method providing directions for the shortest time route to a vehicle driver in response to a route request. At step 510, a vehicle driver through a telematics unit requests directions for a route between a vehicle's current location at a Home 1 to a destination Store 1 (See FIG. 3). At step 520, a navigation server receives the route request from Home 1 to Store 1. At step 530, the navigation server analyzes different routes between Home 1 and Store 1 to determine the shortest time route. Thus, based on the time-of-day, the navigation server compares the travel times between different routes. For example, referring to FIG. 3, when a route request is sent during the middle of the afternoon, the average travel time between Home 1 and Store 1 using Interstate Highway 90 may be 35 minutes, whereas the average travel time using local state road 206 may be 45 minutes. At step 540, the navigation server sends directions for the shortest time route between Home 1 and Store 1. Thus, in the above example, the navigation server sends directions for the route traversing Interstate Highway 90 because it is the shortest time route.

FIGS. 6-7 are tables that contain examples of using historical traffic data to calculate travel times between a Location A and a Location B as shown in FIG. 3. FIG. 6 is a chart that shows six different routes 602 that traverse Location A (604) and Location B (606) when using Interstate Highway 90 as shown in FIG. 3. These include Home 1 to Store 1 (612), Home 2 to Store 2 (622), Home 3 to Store 3 (632), Home 4 to Store 4 (642), Home 5 to Store 5 (652), and Home 6 to Store 6 (662). For each route, the vehicle driver sends a route request from a Location A to a navigation server. The chart shows the time-of-day for each request sent from a Location A (604, 614, 624, 634, 644, 654, and 664). Similarly, for each route, the vehicle driver sends another route request from a Location B to the navigation server. The chart shows the time-of-day for each request sent from a Location B (606, 616, 626, 636, 646, 656, and 666). The navigation server then calculates the travel time between a Location A and Location B for each route (608, 618, 628, 638, 648, 658, and 668). It then updates its average time between Location A and Location B (610, 620, 630, 640, 650, 660, and 670). For example, the travel time between Location A and Location B during the first route 612 was 50 minutes and hence the average time was also 50 minutes because this was the first travel time calculated between Location A and Location B. During the second route 622 the travel time between Location A and Location B was 30 minutes. Thus, the average travel time between Location A and Location B was 40 minutes. That is, the average of the travel time between the first route 612 (50 minutes) and the second route 622 (30 minutes). The navigation server then calculates the travel time between Location A and Location B for each route and updates the average travel time between Location A and Location B, accordingly. After calculating the travel times between Location A and Location B for each of the six routes, the navigation server finds the average travel time between Location A and Location B to be 38 minutes.

FIG. 7 shows two different charts that display the average travel time between Location A and Location B during rush hour and the average travel time between Location A and Location B during non-rush hour using the routes shown in FIG. 6. Note that aspects of the invention can use other time-of day categories other than rush hour and non-rush that include but are note limited to, weekday, weekend, holiday, seasonal, summer winter, fall, spring, day, night, morning, afternoon, evening, and night, etc. Thus, during rush hour the average travel time between Location A and Location B is 48 minutes. Alternatively, during non-rush hour, the average travel time between Location A and Location B is only 28 minutes.

FIGS. 8-9 are tables that contain examples of using historical traffic data to calculate travel times between a Location C and a Location D. FIG. 8 is a chart that shows six different routes 802 that traverse Location C (804) and Location D (806) when using local state road 206 as shown in FIG. 3. It calculates the travel times during each route and the average travel time between Location C and Location D similar to the way in which FIG. 6 was described to calculate the travel times during each route and average travel time between Location A and Location B. Thus, after calculating the travel times between Location C and Location D for each of the six routes, the navigation server finds the average travel time between Location C and Location D to be 39 minutes. Thus, if a vehicle driver requests route directions from a Home 1 and a Store 1 as shown in FIG. 3, the navigation server provides directions via Interstate Highway 90 that traverses Location A and Location B rather than local state road 206 that traverses Location C and Location D because it is the shortest time route between Home 1 and Store 1.

FIG. 9 is similar to FIG. 7 but shows two different charts that display the average travel time between Location C and Location D during rush hour and the average travel time between Location C and Location D during non-rush hour using the routes shown in FIG. 8. Thus, during rush hour the average travel time between Location C and Location D is 42 minutes. Alternatively, during non-rush hour, the average travel time between Location C and Location D is only 35 minutes.

Therefore, when a navigation server receives a subsequent route request it analyzes different routes from the vehicle's current location to the destination based on the time-of-day of the route request and the time-of-day categories (e.g., rush hour, non-rush hour, etc.) of the stored average travel times for the different routes. The navigation may then select the route with shortest average travel time and send directions for that route. For example, there may be a subsequent route request that is sent from Home 1 and requesting directions to a Store 1 during rush hour as shown in FIG. 3. A navigation server analyzes the data as shown in FIGS. 6-9 because there are two ways to reach Store 1 from Home 1, namely via Interstate Highway 90 that traverses Location A and Location B or via local state road 206 that traverses Location C and Location D. During rush hour, the navigation server provides directions to the route that traverses Location C and Location D because it has a shorter average travel time than the route that traverses Location A and Location B (See FIGS. 6-9).

It will be appreciated that calculations and actions described herein are, unless otherwise noted or apparent from the context, executed by a computing device (e.g., a computer, server, communications device, etc.) via the reading and execution of computer-readable instructions stored on a computer-readable medium. As used herein, the terms "computer-readable media" and "computer-readable medium" refer only to human tangible media such as disk drives, magnetic and electrical storage devices, flash drives, DVD, CDs, RAM, ROM, optical drives, etc., to the exclusion of human intangible media such as infrared or electronic signals.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Examples of the invention are described herein, including the best mode known to the inventors for carrying out the invention. Variations of those examples may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A computer-implemented method for estimating travel times between vehicle locations by a vehicle navigation system, the method comprising:

receiving, by a navigation server, a first route request from a telematics unit wherein the first route request contains a destination, a first time-of-day and a first location of a vehicle;

receiving, by a navigation server, a second route request from the telematics unit wherein the second route request contains the destination, a second time-of-day and a second location of the vehicle;

calculating, by a navigation server, a travel time between the first location of the vehicle and the second location of the vehicle using a difference between the first time-of-day and the second time-of-day;

averaging, by the navigation server, the calculated travel time with other calculated travel times between the first location of the vehicle and the second location of the vehicle to render an averaged result; and storing, by the navigation server, the averaged result as an estimated travel time between the first location of the vehicle and the second location of the vehicle in an electronic database.

2. The method according to claim 1, wherein the averaging is based on one or more time-of-day categories, wherein the estimated travel time is associated with one of the time-of-day categories.

3. The method according to claim 1 wherein the telematics unit records the first time-of-day, the first location of the vehicle, the second time-of-day, and the second location of the vehicle.

4. The method according to claim wherein the vehicle navigation system further comprises:
- one or more software applications implemented by the navigation server to calculate the current travel time and update the stored travel time; one or more electronic databases that store the stored travel time and a repository of different route directions from the first location of the vehicle to the second location of the vehicle; and
- a wireless communication network that provides a communication link between the telematics unit installed in the vehicle to the navigation server.

5. The method according to claim 2, wherein the time-of-day categories are selected from the group consisting of rush hour, non-rush hour, weekday, weekend, holiday, seasonal, summer winter, fall, spring, day, night, morning, afternoon, evening, and night.

* * * * *